United States Patent
Shukla et al.

(10) Patent No.: US 9,294,997 B1
(45) Date of Patent: Mar. 22, 2016

(54) WAKEUP BEACONS FOR MESH NETWORKS

(71) Applicant: Marvell International Ltd., Hamilton (BM)

(72) Inventors: Ashish Kumar Shukla, Pune (IN); Sandesh Goel, Noida (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/293,640

(22) Filed: Jun. 2, 2014

Related U.S. Application Data

(63) Continuation of application No. 13/099,169, filed on May 2, 2011, now Pat. No. 8,767,771.

(60) Provisional application No. 61/333,546, filed on May 11, 2010.

(51) Int. Cl.
*H04L 12/56* (2006.01)
*H04W 52/02* (2009.01)
*H04B 1/16* (2006.01)

(52) U.S. Cl.
CPC .............. *H04W 52/0222* (2013.01); *H04B 1/16* (2013.01); *H04W 52/02* (2013.01)

(58) Field of Classification Search
CPC ............ H04L 29/08612; H04L 67/141; H04L 67/142; H04L 2012/421; H04B 1/16; H04B 7/00; H04B 1/38; H04W 52/02
USPC .................................. 370/468, 406, 403, 396
See application file for complete search history.

(56) References Cited

U.S. PATENT DOCUMENTS

| | | | |
|---|---|---|---|
| 4,337,463 | A | 6/1982 | Vangen |
| 4,805,215 | A | 2/1989 | Miller |
| 5,347,234 | A | 9/1994 | Gersbach et al. |
| 5,634,207 | A | 5/1997 | Yamaji et al. |
| 5,673,291 | A | 9/1997 | Dent |
| 5,708,656 | A | 1/1998 | Noneman et al. |
| 5,847,616 | A | 12/1998 | Ng et al. |
| 5,995,819 | A | 11/1999 | Yamaji et al. |
| 6,035,210 | A | 3/2000 | Endo et al. |
| 6,167,245 | A | 12/2000 | Welland et al. |
| 6,285,262 | B1 | 9/2001 | Kuriyama |
| 6,320,919 | B1 | 11/2001 | Khayrallah et al. |
| 6,347,091 | B1 | 2/2002 | Wallentin et al. |

(Continued)

FOREIGN PATENT DOCUMENTS

| | | |
|---|---|---|
| CN | 102067689 | 5/2011 |
| EP | 1860827 | 11/2007 |

(Continued)

OTHER PUBLICATIONS

"Final Office Action", U.S. Appl. No. 12/646,721, Nov. 28, 2014, 19 pages.

(Continued)

*Primary Examiner* — Ricky Ngo
*Assistant Examiner* — Dewanda Samuel

(57) ABSTRACT

This disclosure describes techniques and apparatuses for wakeup beacons for mesh networks, which often permits nodes of a mesh network to save power when operating in a power-save mode. These wakeup beacons can be sent at high transmission rates and/or be small in size, thereby reducing the time a node must be awake to transmit and receive communications.

20 Claims, 8 Drawing Sheets

(56) References Cited

U.S. PATENT DOCUMENTS

| | | | |
|---|---|---|---|
| 6,366,622 B1 | 4/2002 | Brown et al. |
| 6,374,117 B1 | 4/2002 | Denkert et al. |
| 6,438,364 B1 | 8/2002 | Waite |
| 6,445,342 B1 | 9/2002 | Thomas et al. |
| 6,452,458 B1 | 9/2002 | Tanimoto |
| 6,509,777 B2 | 1/2003 | Razavi et al. |
| 6,519,461 B1 | 2/2003 | Andersson et al. |
| 6,535,037 B2 | 3/2003 | Maligeorgos |
| 6,553,229 B1 | 4/2003 | Dent |
| 6,640,308 B1 | 10/2003 | Keyghobad et al. |
| 6,650,195 B1 | 11/2003 | Brunn et al. |
| 6,675,328 B1 | 1/2004 | Krishnamachari et al. |
| 6,741,846 B1 | 5/2004 | Welland et al. |
| 6,741,862 B2 | 5/2004 | Chung et al. |
| 6,754,189 B1 | 6/2004 | Cloutier et al. |
| 6,760,671 B1 | 7/2004 | Batcher et al. |
| 6,816,452 B1 | 11/2004 | Maehata |
| 6,816,718 B2 | 11/2004 | Yan et al. |
| 6,829,313 B1 | 12/2004 | Xu |
| 6,922,433 B2 | 7/2005 | Tamura |
| 6,934,566 B2 | 8/2005 | Kang et al. |
| 6,946,950 B1 | 9/2005 | Ueno et al. |
| 6,954,708 B2 | 10/2005 | Rakshani et al. |
| 7,079,811 B2 | 7/2006 | Lee et al. |
| 7,139,540 B2 | 11/2006 | Wu et al. |
| 7,173,431 B1 | 2/2007 | Lo et al. |
| 7,180,901 B2 | 2/2007 | Chang et al. |
| 7,200,799 B2 | 4/2007 | Wang et al. |
| 7,206,840 B2 | 4/2007 | Choi et al. |
| 7,212,798 B1 | 5/2007 | Adams et al. |
| 7,213,194 B2 | 5/2007 | Nieminen |
| 7,239,882 B1 | 7/2007 | Cook |
| 7,257,095 B2 | 8/2007 | Liu |
| 7,286,009 B2 | 10/2007 | Andersen et al. |
| 7,298,183 B2 | 11/2007 | Mirzaei et al. |
| 7,310,023 B2 | 12/2007 | Cha et al. |
| 7,319,849 B2 | 1/2008 | Womac |
| 7,342,895 B2 | 3/2008 | Serpa et al. |
| 7,355,416 B1 | 4/2008 | Darshan |
| 7,377,441 B2 | 5/2008 | Wiklof et al. |
| 7,395,040 B2 | 7/2008 | Behzad |
| 7,403,018 B1 | 7/2008 | Lo et al. |
| 7,447,163 B1 | 11/2008 | Thomson et al. |
| 7,529,548 B2 | 5/2009 | Sebastian |
| 7,551,948 B2 | 6/2009 | Meier et al. |
| 7,564,826 B2 | 7/2009 | Sherman et al. |
| 7,580,397 B2 | 8/2009 | Arai et al. |
| 7,595,768 B2 | 9/2009 | Li et al. |
| 7,599,671 B2 | 10/2009 | Kopikare et al. |
| 7,616,935 B2 | 11/2009 | Fernandez-Corbaton et al. |
| 7,626,966 B1 | 12/2009 | Ruiter et al. |
| 7,656,205 B2 | 2/2010 | Chen et al. |
| 7,659,003 B2 | 2/2010 | Aoki et al. |
| 7,672,645 B2 | 3/2010 | Kilpatrick et al. |
| 7,686,216 B2 | 3/2010 | Walczyk et al. |
| 7,689,190 B2 | 3/2010 | Kerth et al. |
| 7,711,004 B2 | 5/2010 | Xu |
| 7,826,411 B2 | 11/2010 | Gonikberg et al. |
| 7,849,333 B2 | 12/2010 | Schindler |
| 7,876,786 B2 | 1/2011 | Bahl et al. |
| 7,881,746 B2 | 2/2011 | Desai |
| 7,881,755 B1 * | 2/2011 | Mishra et al. ................. 455/574 |
| 7,898,948 B2 | 3/2011 | DiGirolamo et al. |
| 7,936,714 B1 | 5/2011 | Karr et al. |
| 7,944,867 B2 * | 5/2011 | Usuba .................. H04W 48/08 370/311 |
| 7,957,340 B2 | 6/2011 | Choi et al. |
| 7,965,710 B1 | 6/2011 | Choi |
| 7,966,036 B2 | 6/2011 | Kojima |
| 7,995,544 B2 | 8/2011 | Benveniste |
| 8,000,715 B2 | 8/2011 | Melpignano et al. |
| 8,014,329 B2 * | 9/2011 | Gong ...................... 370/311 |
| 8,060,017 B2 | 11/2011 | Schlicht et al. |
| 8,064,363 B2 | 11/2011 | Kohvakka et al. |
| 8,072,913 B2 | 12/2011 | Desai |
| 8,077,652 B2 | 12/2011 | Thesling |
| 8,078,111 B2 | 12/2011 | Jovicic et al. |
| 8,081,038 B2 | 12/2011 | Lee et al. |
| 8,107,391 B2 | 1/2012 | Wu et al. |
| 8,139,670 B1 | 3/2012 | Son et al. |
| 8,140,075 B2 | 3/2012 | Watanabe |
| 8,149,715 B1 | 4/2012 | Goel |
| 8,150,328 B2 | 4/2012 | Chaudhri et al. |
| 8,170,002 B2 * | 5/2012 | Wentink ..................... 370/351 |
| 8,170,546 B2 | 5/2012 | Bennett |
| 8,187,662 B2 | 5/2012 | Blinn et al. |
| 8,189,506 B2 | 5/2012 | Kneckt et al. |
| 8,203,985 B2 | 6/2012 | Gong et al. |
| 8,204,015 B2 | 6/2012 | Chaudhri et al. |
| 8,229,087 B2 | 7/2012 | Sumioka et al. |
| 8,254,296 B1 | 8/2012 | Lambert |
| 8,274,894 B2 * | 9/2012 | Kneckt et al. ................. 370/235 |
| 8,275,314 B1 | 9/2012 | Lin |
| 8,310,967 B1 | 11/2012 | Goel |
| 8,315,564 B2 | 11/2012 | Banerjea |
| 8,340,034 B1 | 12/2012 | Lee |
| 8,364,188 B2 | 1/2013 | Srinivasan et al. |
| 8,369,782 B1 | 2/2013 | Lin et al. |
| 8,472,427 B1 | 6/2013 | Wheeler et al. |
| 8,472,968 B1 | 6/2013 | Kim |
| 8,483,740 B2 | 7/2013 | Somasundaram et al. |
| 8,532,041 B1 | 9/2013 | Lambert et al. |
| 8,553,561 B1 | 10/2013 | Chokshi et al. |
| 8,571,479 B2 | 10/2013 | Banerjea |
| 8,577,305 B1 | 11/2013 | Rossi et al. |
| 8,588,705 B1 | 11/2013 | Tsui et al. |
| 8,600,324 B1 | 12/2013 | Cousinard et al. |
| 8,649,734 B1 | 2/2014 | Lin et al. |
| 8,655,279 B2 | 2/2014 | Banerjea |
| 8,737,370 B2 | 5/2014 | Wentink |
| 8,750,278 B1 | 6/2014 | Wagholikar et al. |
| 8,767,771 B1 | 7/2014 | Shukla et al. |
| 8,817,662 B2 | 8/2014 | Mahaffy et al. |
| 8,817,682 B1 | 8/2014 | Goel et al. |
| 8,861,469 B1 | 10/2014 | Lee et al. |
| 8,891,497 B1 | 11/2014 | Vleugels et al. |
| 8,902,745 B1 | 12/2014 | Goel et al. |
| 9,036,517 B2 | 5/2015 | Bijwe |
| 9,072,047 B1 | 6/2015 | Goel et al. |
| 9,078,108 B1 | 7/2015 | Wagholikar et al. |
| 9,125,216 B1 | 9/2015 | Choi et al. |
| 2002/0025810 A1 | 2/2002 | Takayama et al. |
| 2002/0049854 A1 | 4/2002 | Cox et al. |
| 2002/0102941 A1 | 8/2002 | Kuiri et al. |
| 2003/0040316 A1 | 2/2003 | Stanforth et al. |
| 2003/0148750 A1 | 8/2003 | Yan et al. |
| 2003/0198200 A1 | 10/2003 | Diener et al. |
| 2003/0214430 A1 | 11/2003 | Husted et al. |
| 2004/0013128 A1 | 1/2004 | Moreton |
| 2004/0063403 A1 | 4/2004 | Durrant |
| 2004/0105401 A1 * | 6/2004 | Lee ................. 370/311 |
| 2004/0110470 A1 | 6/2004 | Tsien et al. |
| 2004/0162106 A1 | 8/2004 | Monroe et al. |
| 2004/0192222 A1 | 9/2004 | Vaisanen et al. |
| 2004/0198297 A1 | 10/2004 | Oh et al. |
| 2004/0214575 A1 | 10/2004 | Jovanovic |
| 2004/0233881 A1 | 11/2004 | Kang et al. |
| 2004/0242192 A1 | 12/2004 | Marce et al. |
| 2004/0264372 A1 | 12/2004 | Huang |
| 2004/0264396 A1 | 12/2004 | Ginzburg et al. |
| 2004/0264397 A1 | 12/2004 | Benveniste |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0041581 A1 | 2/2005 | Kuusinen et al. |
| 2005/0043027 A1 * | 2/2005 | Emeott et al. ............. 455/435.1 |
| 2005/0047386 A1 * | 3/2005 | Yi .................. 370/345 |
| 2005/0058151 A1 | 3/2005 | Yeh |
| 2005/0064840 A1 | 3/2005 | Heydari et al. |
| 2005/0090218 A1 | 4/2005 | Ishida et al. |
| 2005/0120119 A1 | 6/2005 | Bhanu et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |

(56) References Cited

U.S. PATENT DOCUMENTS

| | | |
|---|---|---|
| 2005/0195786 A1 | 9/2005 | Shpak |
| 2005/0206554 A1 | 9/2005 | Yamaura |
| 2005/0233704 A1* | 10/2005 | Maekawa ............... H04L 12/12 455/69 |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0049880 A1 | 3/2006 | Rein et al. |
| 2006/0063509 A1 | 3/2006 | Pincu et al. |
| 2006/0079232 A1 | 4/2006 | Omori et al. |
| 2006/0114044 A1 | 6/2006 | Mintchev et al. |
| 2006/0120338 A1 | 6/2006 | Hwang et al. |
| 2006/0128308 A1 | 6/2006 | Michael et al. |
| 2006/0128347 A1 | 6/2006 | Piriyapoksombut et al. |
| 2006/0189359 A1 | 8/2006 | Kammer et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0223474 A1 | 10/2006 | Yoshizaki et al. |
| 2006/0239443 A1 | 10/2006 | Oxford et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0281404 A1 | 12/2006 | Lee et al. |
| 2006/0282541 A1* | 12/2006 | Hiroki ............................ 709/228 |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0026810 A1 | 2/2007 | Love et al. |
| 2007/0032211 A1 | 2/2007 | Kopikare et al. |
| 2007/0060057 A1 | 3/2007 | Matsuo et al. |
| 2007/0077908 A1 | 4/2007 | Vorenkamp et al. |
| 2007/0081553 A1 | 4/2007 | Cicchetti et al. |
| 2007/0103829 A1 | 5/2007 | Darshan et al. |
| 2007/0109973 A1 | 5/2007 | Trachewsky |
| 2007/0142080 A1 | 6/2007 | Tanaka et al. |
| 2007/0173286 A1 | 7/2007 | Carter et al. |
| 2007/0178888 A1 | 8/2007 | Alfano et al. |
| 2007/0183368 A1 | 8/2007 | Stavinov |
| 2007/0183443 A1 | 8/2007 | Won |
| 2007/0200622 A1 | 8/2007 | Filoramo et al. |
| 2007/0202814 A1 | 8/2007 | Ono et al. |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0223626 A1 | 9/2007 | Waxman |
| 2007/0237122 A1* | 10/2007 | Liu et al. ................. 370/338 |
| 2007/0238482 A1 | 10/2007 | Rayzman et al. |
| 2007/0242645 A1 | 10/2007 | Stephenson et al. |
| 2007/0263587 A1 | 11/2007 | Savoor et al. |
| 2007/0264959 A1 | 11/2007 | Carrez |
| 2007/0268862 A1 | 11/2007 | Singh et al. |
| 2007/0280471 A1 | 12/2007 | Fallahi et al. |
| 2007/0284441 A1 | 12/2007 | Walczyk et al. |
| 2007/0286298 A1 | 12/2007 | Choi et al. |
| 2007/0297388 A1 | 12/2007 | Appaji et al. |
| 2008/0027033 A1 | 1/2008 | Gonda et al. |
| 2008/0045162 A1 | 2/2008 | Rofougaran et al. |
| 2008/0056201 A1 | 3/2008 | Bennett |
| 2008/0069034 A1 | 3/2008 | Buddhikot et al. |
| 2008/0076466 A1 | 3/2008 | Larsson |
| 2008/0080446 A1 | 4/2008 | Chung |
| 2008/0095058 A1 | 4/2008 | Dalmases et al. |
| 2008/0095059 A1 | 4/2008 | Chu |
| 2008/0100494 A1 | 5/2008 | Yamaura |
| 2008/0111639 A1 | 5/2008 | Ryckaert et al. |
| 2008/0129118 A1 | 6/2008 | Diab |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0238679 A1 | 10/2008 | Rofougaran et al. |
| 2008/0259846 A1 | 10/2008 | Gonikberg et al. |
| 2008/0261552 A1 | 10/2008 | Chung |
| 2008/0261640 A1 | 10/2008 | Yoshida |
| 2008/0262991 A1 | 10/2008 | Kapoor et al. |
| 2008/0272818 A1 | 11/2008 | Ko |
| 2008/0279163 A1 | 11/2008 | Desai |
| 2008/0310067 A1 | 12/2008 | Diab et al. |
| 2008/0320108 A1 | 12/2008 | Murty et al. |
| 2009/0005061 A1 | 1/2009 | Ward et al. |
| 2009/0010210 A1 | 1/2009 | Hiertz et al. |
| 2009/0080390 A1 | 3/2009 | Zhou et al. |
| 2009/0137206 A1 | 5/2009 | Sherman et al. |
| 2009/0143043 A1 | 6/2009 | Yoshizaki et al. |
| 2009/0168686 A1 | 7/2009 | Love et al. |
| 2009/0168725 A1 | 7/2009 | Mishra |
| 2009/0170497 A1 | 7/2009 | Miao et al. |
| 2009/0175250 A1 | 7/2009 | Mathur et al. |
| 2009/0190541 A1 | 7/2009 | Abedi |
| 2009/0196210 A1 | 8/2009 | Desai |
| 2009/0196227 A1 | 8/2009 | Bahr |
| 2009/0202013 A1 | 8/2009 | Sebastian |
| 2009/0209288 A1 | 8/2009 | Rofougaran |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0258603 A1 | 10/2009 | Ghaboosi et al. |
| 2009/0268652 A1 | 10/2009 | Kneckt et al. |
| 2009/0280762 A1 | 11/2009 | Park et al. |
| 2009/0285264 A1 | 11/2009 | Aldana et al. |
| 2009/0291640 A1 | 11/2009 | Bhattad et al. |
| 2009/0311961 A1 | 12/2009 | Banerjea |
| 2009/0312027 A1 | 12/2009 | Foschini et al. |
| 2009/0316667 A1 | 12/2009 | Hirsch et al. |
| 2009/0321056 A1 | 12/2009 | Ran et al. |
| 2010/0009675 A1 | 1/2010 | Wijting et al. |
| 2010/0011231 A1 | 1/2010 | Banerjea et al. |
| 2010/0029325 A1 | 2/2010 | Wang et al. |
| 2010/0039974 A1* | 2/2010 | Toshimitsu et al. ........... 370/311 |
| 2010/0052796 A1 | 3/2010 | Menkhoff |
| 2010/0061244 A1 | 3/2010 | Meier et al. |
| 2010/0062799 A1 | 3/2010 | Ishii et al. |
| 2010/0069112 A1 | 3/2010 | Sun et al. |
| 2010/0077275 A1 | 3/2010 | Yu et al. |
| 2010/0080319 A1 | 4/2010 | Blocher et al. |
| 2010/0082957 A1 | 4/2010 | Iwata |
| 2010/0097952 A1 | 4/2010 | McHenry et al. |
| 2010/0103867 A1 | 4/2010 | Kishiyama et al. |
| 2010/0124213 A1 | 5/2010 | Ise et al. |
| 2010/0130129 A1 | 5/2010 | Chang et al. |
| 2010/0138549 A1 | 6/2010 | Goel et al. |
| 2010/0165896 A1 | 7/2010 | Gong et al. |
| 2010/0216497 A1 | 8/2010 | Kawasaki |
| 2010/0238793 A1 | 9/2010 | Alfano et al. |
| 2010/0248734 A1 | 9/2010 | Yamazaki et al. |
| 2010/0283654 A1 | 11/2010 | Waheed et al. |
| 2010/0293293 A1 | 11/2010 | Beser |
| 2010/0303026 A1 | 12/2010 | Chaudhri et al. |
| 2010/0311342 A1 | 12/2010 | Arbel |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0021240 A1 | 1/2011 | Hiltunen et al. |
| 2011/0053522 A1 | 3/2011 | Rofougaran et al. |
| 2011/0069689 A1 | 3/2011 | Grandhi et al. |
| 2011/0097998 A1 | 4/2011 | Ko et al. |
| 2011/0103363 A1 | 5/2011 | Bennett |
| 2011/0142014 A1 | 6/2011 | Banerjee et al. |
| 2011/0161697 A1 | 6/2011 | Qi et al. |
| 2011/0164538 A1 | 7/2011 | Karr et al. |
| 2011/0194519 A1 | 8/2011 | Habetha |

(56) References Cited

U.S. PATENT DOCUMENTS

| | | |
|---|---|---|
| 2011/0280219 A1 | 11/2011 | Fashandi et al. |
| 2011/0292925 A1* | 12/2011 | Ho et al. ............ 370/338 |
| 2012/0020319 A1 | 1/2012 | Song et al. |
| 2012/0025921 A1 | 2/2012 | Yang et al. |
| 2012/0039176 A1 | 2/2012 | Eshan et al. |
| 2012/0099476 A1 | 4/2012 | Mahaffy |
| 2012/0244805 A1 | 9/2012 | Haikonen et al. |
| 2012/0250576 A1 | 10/2012 | Rajamani et al. |
| 2012/0276938 A1 | 11/2012 | Wagholikar et al. |
| 2012/0327779 A1 | 12/2012 | Gell et al. |
| 2013/0045687 A1 | 2/2013 | Banerjea |
| 2013/0045688 A1 | 2/2013 | Banerjea |
| 2013/0057344 A1 | 3/2013 | Touzard et al. |
| 2013/0114548 A1 | 5/2013 | Banerjea |
| 2013/0176903 A1 | 7/2013 | Bijwe |
| 2013/0223418 A1 | 8/2013 | Schmidt |
| 2013/0227152 A1 | 8/2013 | Lee et al. |
| 2014/0004794 A1 | 1/2014 | Contaldo |
| 2014/0044106 A1 | 2/2014 | Bhagwat |
| 2014/0073251 A1 | 3/2014 | Banerjea |
| 2014/0362735 A1 | 12/2014 | Mahaffy |

FOREIGN PATENT DOCUMENTS

| | | |
|---|---|---|
| EP | 2299642 | 3/2011 |
| EP | 2456275 | 5/2012 |
| JP | 2006174162 | 6/2006 |
| JP | 200728568 | 2/2007 |
| JP | 2007028568 | 2/2007 |
| WO | WO-0178252 | 10/2001 |
| WO | WO-02082751 | 10/2002 |
| WO | WO-02091623 | 11/2002 |
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008707777 | 6/2008 |
| WO | WO-2008150122 | 12/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Non-Final Office Action", U.S. Appl. No. 13/622,916, Sep. 10, 2014, 10 pages.

"Non-Final Office Action", U.S. Appl. No. 13/735,458, Sep. 24, 2014, 8 pages.

"Non-Final Office Action", U.S. Appl. No. 14/275,615, Oct. 6, 2014, 28 pages.

"Non-Final Office Action", U.S. Appl. No. 14/466,687, Oct. 3, 2014, 5 pages.

"Supplemental Notice of Allowance", U.S. Appl. No. 13/429,071, Sep. 29, 2014, 2 pages.

"Supplemental Notice of Allowance", U.S. Appl. No. 13/429,071, Oct. 27, 2014, 2 pages.

"Final Office Action", U.S. Appl. No. 12/646,802, Dec. 17, 2014, 17 pages.

"Notice of Allowance", U.S. Appl. No. 13/429,090, Feb. 20, 2015, 10 pages.

"Notice of Allowance", U.S. Appl. No. 13/735,458, Jan. 12, 2015, 4 pages.

"Notice of Allowance", U.S. Appl. No. 14/275,615, Feb. 27, 2015, 7 pages.

Deering,"Version 6 (IPv6) Specification", RFC2460, Dec. 1998, 35 pages.

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

"Advisory Action", U.S. Appl. No. 11/945,183, Nov. 9, 2010, 2 pages.

"Advisory Action", U.S. Appl. No. 12/190,251, Dec. 7, 2011, 3 pages.

"Advisory Action", U.S. Appl. No. 12/646,721, Aug. 13, 2013, 3 pages.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 11/945,183, Sep. 13, 2010, 12 pages.

"Final Office Action", U.S. Appl. No. 12/186,429, Oct. 13, 2011, 23 pages.

"Final Office Action", U.S. Appl. No. 12/190,251, Sep. 13, 2011, 15 pages.

"Final Office Action", U.S. Appl. No. 12/323,292, Aug. 24, 2012, 26 pages.

"Final Office Action", U.S. Appl. No. 12/358,955, Feb. 17, 2012, 26 pages.

"Final Office Action", U.S. Appl. No. 12/358,955, Mar. 18, 2013, 12 pages.

"Final Office Action", U.S. Appl. No. 12/484,563, Apr. 24, 2012, 18 pages.

"Final Office Action", U.S. Appl. No. 12/487,425, May 3, 2012, 9 pages.

"Final Office Action", U.S. Appl. No. 12/534,361, Feb. 29, 2012, 13 pages.

"Final Office Action", U.S. Appl. No. 12/542,845, Apr. 23, 2014, 22 pages.

"Final Office Action", U.S. Appl. No. 12/542,845, Sep. 25, 2012, 23 pages.

"Final Office Action", U.S. Appl. No. 12/616,454, Apr. 11, 2012, 19 pages.

"Final Office Action", U.S. Appl. No. 12/646,721, Jun. 6, 2013, 16 pages.

"Final Office Action", U.S. Appl. No. 12/646,802, Nov. 15, 2012, 15 pages.

"Final Office Action", U.S. Appl. No. 12/759,336, Feb. 25, 2013, 11 pages.

"Final Office Action", U.S. Appl. No. 13/429,090, Jul. 16, 2014, 13 pages.

"Foreign Office Action", CN Application No. 200980122587.0, Sep. 10, 2013, 11 Pages.

"Foreign Notice of Allowance", JP Application No. 2011-513586, Jul. 16, 2013, 2 pages.

"Foreign Office Action", CN Application No. 200980122587.0, Jan. 24, 2014, 10 Pages.

"Foreign Office Action", CN Application No. 200980122587.0, Feb. 21, 2013, 17 pages.

"Foreign Office Action", EP Application No. 09789754.0, May 17, 2011, 8 pages.

"Foreign Office Action", European Patent Application No. 09789754.0, Mar. 11, 2013, 4 Pages.

"Foreign Office Action", European Patent Application No. 09789754.0, Jul. 12, 2012, 4 pages.

"Foreign Office Action", JP Application No. 2011-513586, Apr. 9, 2013, 4 Pages.

"Foreign Office Action", JP Application No. 2011-513586, Oct. 23, 2012, 7 pages.

"Further Higher Data Rate Extension in the 2.4 GHz Band", IEEE P802.11g/D8.2, Draft Supplement to Standard [for] Information Technology, Apr. 2003, 69 pages.

"IEEE Standard for Information Technology—Telecommunications and Information Exchange between Systems—Local and Metropolitan Area Networks—Specific Requirements", IEEE Std. 802.11-2007, Jun. 12, 2007, 1232 pages.

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k-2008, Jun. 12, 2008, 244 pages.

(56) References Cited

OTHER PUBLICATIONS

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

"IEEE Standard for Information Technology—Telecommunications and information exchange between systems—Local and metropolitan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.

"Information Technology—Telecommunications and Information Exchange Between systems—Local and Metropolitan Area Networks—Specific Requirements", IEEE Standard, Aug. 1, 2005, pp. 1-60.

"Information Technology—Telecommunications and Information Exchange between Systems—Local and Metropolitan Area Networks—Specific Requirements", Part 11: Wireless LAN Medium Access Control (MAC) and Physical Layer (PHY) Specifications, IEEE Standard 802.11h-2003 (Amendment to IEEE Std 802.11-1993), Oct. 14, 2003, 80 pages.

"International Search Report and Written Opinion", Application No. PCT/US2013/025144, Jun. 5, 2013, 10 pages.

"International Search Report and Written Opinion", Application No. PCT/IB2013/001962, Feb. 6, 2014, 11 Pages.

"International Search Report and Written Opinion", Application No. PCT/US2012/035597, Aug. 6, 2012, 13 pages.

"International Search Report and Written Opinion", Application No. PCT/US2009/046289, Oct. 29, 2009, 13 pages.

"International Search Report and Written Opinion", Application No. PCT/US2011/054358, Dec. 16, 2011, 13 pages.

"International Search Report and Written Opinion", Application No. PCT/IB2013/000390, Aug. 21, 2013, 19 Pages.

"Introduction to 802.11n Outdoor Wireless Networks", InscapeData White Paper, Mar. 29, 2011, 9 pages.

"Non-Final Office Action", U.S. Appl. No. 13/429,071, Mar. 28, 2014, 8 pages.

"Non-Final Office Action", U.S. Appl. No. 13/429,090, Oct. 24, 2013, 13 pages.

"Non-Final Office Action", U.S. Appl. No. 11/945,183, Apr. 5, 2010, 8 pages.

"Non-Final Office Action", U.S. Appl. No. 12/167,841, Jul. 15, 2011, 10 pages.

"Non-Final Office Action", U.S. Appl. No. 12/186,429, Apr. 25, 2011, 19 pages.

"Non-Final Office Action", U.S. Appl. No. 12/190,240, Jan. 6, 2012, 7 pages.

"Non-Final Office Action", U.S. Appl. No. 12/190,251, Mar. 29, 2012, 11 pages.

"Non-Final Office Action", U.S. Appl. No. 12/190,251, Mar. 29, 2011, 8 pages.

"Non-Final Office Action", U.S. Appl. No. 12/235,333, Jun. 28, 2011, 16 pages.

"Non-Final Office Action", U.S. Appl. No. 12/323,292, Dec. 21, 2011, 17 pages.

"Non-Final Office Action", U.S. Appl. No. 12/358,955, Sep. 6, 2011, 24 pages.

"Non-Final Office Action", U.S. Appl. No. 12/358,955, Aug. 20, 2012, 33 pages.

"Non-Final Office Action", U.S. Appl. No. 12/478,446, Dec. 28, 2011, 17 pages.

"Non-Final Office Action", U.S. Appl. No. 12/484,563, Oct. 4, 2011, 13 pages.

"Non-Final Office Action", U.S. Appl. No. 12/487,425, Jan. 12, 2012, 7 pages.

"Non-Final Office Action", U.S. Appl. No. 12/534,361, Oct. 12, 2011, 11 pages.

"Non-Final Office Action", U.S. Appl. No. 12/542,845, Oct. 23, 2013, 29 pages.

"Non-Final Office Action", U.S. Appl. No. 12/542,845, Apr. 4, 2012, 19 pages.

"Non-Final Office Action", U.S. Appl. No. 12/616,454, Dec. 22, 2011, 8 pages.

"Non-Final Office Action", U.S. Appl. No. 12/646,721, May 8, 2014, 17 pages.

"Non-Final Office Action", U.S. Appl. No. 12/646,721, Nov. 7, 2012, 15 pages.

"Non-Final Office Action", U.S. Appl. No. 12/646,721, May 10, 2012, 15 pages.

"Non-Final Office Action", U.S. Appl. No. 12/646,802, May 21, 2014, 19 pages.

"Non-Final Office Action", U.S. Appl. No. 12/646,802, Mar. 29, 2012, 16 pages.

"Non-Final Office Action", U.S. Appl. No. 12/732,036, Aug. 9, 2012, 13 pages.

"Non-Final Office Action", U.S. Appl. No. 12/759,336, Oct. 4, 2012, 13 pages.

"Non-Final Office Action", U.S. Appl. No. 12/883,054, Nov. 22, 2013, 18 pages.

"Non-Final Office Action", U.S. Appl. No. 13/099,169, Mar. 28, 2013, 12 pages.

"Non-Final Office Action", U.S. Appl. No. 13/099,169, Oct. 4, 2013, 9 pages.

"Non-Final Office Action", U.S. Appl. No. 13/249,740, Mar. 26, 2013, 9 pages.

"Non-Final Office Action", U.S. Appl. No. 13/249,740, Oct. 16, 2013, 9 pages.

"Non-Final Office Action", U.S. Appl. No. 13/479,124, Sep. 27, 2013, 14 pages.

"Non-Final Office Action", U.S. Appl. No. 13/536,506, Apr. 25, 2014, 12 pages.

"Non-Final Office Action", U.S. Appl. No. 13/604,563, Apr. 5, 2013, 6 pages.

"Non-Final Office Action", U.S. Appl. No. 13/656,482, Mar. 19, 2013, 19 pages.

"Non-Final Office Action", U.S. Appl. No. 13/656,502, Feb. 21, 2013, 6 pages.

"Non-Final Office Action", U.S. Appl. No. 13/673,363, Nov. 29, 2013, 12 pages.

"Non-Final Office Action", U.S. Appl. No. 13/722,354, Jan. 17, 2014, 17 pages.

"Non-Final Office Action", U.S. Appl. No. 13/757,276, Jan. 30, 2014, 9 pages.

"Non-Final Office Action", U.S. Appl. No. 13/911,979, Jan. 31, 2014, 19 pages.

"Non-Final Office Action", U.S. Appl. No. 13/923,949, Dec. 17, 2013, 5 pages.

"Notice of Allowance", U.S. Appl. No. 11/945,183, Feb. 23, 2011, 7 pages.

"Notice of Allowance", U.S. Appl. No. 12/167,841, Nov. 25, 2011, 11 pages.

"Notice of Allowance", U.S. Appl. No. 12/186,429, Jun. 6, 2013, 9 pages.

"Notice of Allowance", U.S. Appl. No. 12/190,240, May 16, 2012, 4 pages.

"Notice of Allowance", U.S. Appl. No. 12/190,251, Oct. 4, 2012, 6 pages.

"Notice of Allowance", U.S. Appl. No. 12/235,333, Nov. 15, 2011, 5 pages.

"Notice of Allowance", U.S. Appl. No. 12/323,292, Jun. 28, 2013, 8 pages.

"Notice of Allowance", U.S. Appl. No. 12/358,955, Jul. 1, 2013, 8 pages.

"Notice of Allowance", U.S. Appl. No. 12/478,446, Jun. 14, 2012, 6 pages.

"Notice of Allowance", U.S. Appl. No. 12/484,563, Jul. 9, 2012, 6 pages.

"Notice of Allowance", U.S. Appl. No. 12/487,425, Jul. 26, 2013, 9 pages.

"Notice of Allowance", U.S. Appl. No. 12/534,361, Feb. 14, 2013, 12 pages.

(56) References Cited

OTHER PUBLICATIONS

"Notice of Allowance", U.S. Appl. No. 12/616,454, Aug. 22, 2012, 4 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/759,336, May 3, 2013, 9 pages.
"Notice of Allowance", U.S. Appl. No. 13/099,169, Feb. 12, 2014, 11 pages.
"Notice of Allowance", U.S. Appl. No. 13/249,740, Mar. 11, 2014, 6 pages.
"Notice of Allowance", U.S. Appl. No. 13/429,071, Jul. 31, 2014, 14 pages.
"Notice of Allowance", U.S. Appl. No. 13/479,124, Jan. 30, 2014, 7 pages.
"Notice of Allowance", U.S. Appl. No. 13/604,563, Sep. 26, 2013, 5 pages.
"Notice of Allowance", U.S. Appl. No. 13/656,482, Sep. 3, 2013, 8 pages.
"Notice of Allowance", U.S. Appl. No. 13/656,502, Jun. 25, 2013, 11 pages.
"Notice of Allowance", U.S. Appl. No. 13/673,363, Mar. 24, 2014, 4 pages.
"Notice of Allowance", U.S. Appl. No. 13/722,354, May 15, 2014, 4 pages.
"Notice of Allowance", U.S. Appl. No. 13/923,949, Mar. 31, 2014, 6 pages.
"Part 11: Wireless LAN Medium Access Control (MAC) and Physical Layer (PHY) specifications", IEEE Std 802.11b-1999/Cor Jan. 2001, Amendment 2: Higher-speed Physical Layer (PHY) extension in the 2.4 GHz band,Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band,1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—, IEEE,Apr. 2003, pp. 1-69.
"Part 16: Air Interface for Fixed and Mobile Broadband Wireless Access Systems; Amendment 2: Physical and Medium Access Control Layers for Combined Fixed and Mobile Operation in Licensed Bands", IEEE Std 802.16e, Feb. 28, 2006, 822 pages.
"Part 16: Air Interface for Fixed Broadband Wireless Access Systems", IEEE Std. 802.16, Oct. 1, 2004, 857 pages.
"Restriction Requirement", U.S. Appl. No. 12/167,841, May 12, 2011, 6 pages.
"Search Report", European Application No. 13169350.9, Aug. 13, 2013, 10 Pages.
"Supplemental Notice of Allowance", U.S. Appl. No. 12/186,429, Jul. 10, 2013, 2 pages.
"Supplemental Notice of Allowance", U.S. Appl. No. 12/323,292, Oct. 17, 2013, 2 pages.
"Supplemental Notice of Allowance", U.S. Appl. No. 12/323,292, Oct. 7, 2013, 2 pages.
"Supplemental Notice of Allowance", U.S. Appl. No. 12/358,955, Oct. 11, 2013, 3 pages.
"Supplemental Notice of Allowance", U.S. Appl. No. 12/716,569, Jul. 23, 2012, 2 pages.
"Supplemental Notice of Allowance", U.S. Appl. No. 12/759,336, Jun. 5, 2013, 2 pages.
"Supplemental Notice of Allowance", U.S. Appl. No. 12/759,336, Jun. 18, 2013, 2 pages.
"Supplemental Notice of Allowance", U.S. Appl. No. 12/759,336, Aug. 14, 2013, 2 pages.
"Supplemental Notice of Allowance", U.S. Appl. No. 13/479,124, Apr. 18, 2014, 5 pages.
"Supplemental Notice of Allowance", U.S. Appl. No. 13/656,482, Nov. 29, 2013, 2 pages.
"Supplemental Notice of Allowance", U.S. Appl. No. 13/656,482, Dec. 19, 2013, 2 pages.
"Wi-Fi Peer-to-Peer (P2P) Technical Specification", Wi-Fi Alliance Technical Committee P2P Task Group; Draft Version 1.14, Jun. 25, 2010, 154 pages.
Haas, et al., "Gossip-Based Ad Hoc Routing", IEEE/ACM Transactions on Networking, vol. 14, No. 3, Jun. 2006, pp. 479-491.
Jung, et al., "A Power Control MAC Protocol for Ad Hoc Networks", Wireless Networks ; The Journal of Mobile Communication, Computation and Information, Kluwer Academic Publishers vol. 11, No. 1-2, Jan. 1, 2005, 12 Pages.
Jung, et al., "A Power Control MAC Protocol for Ad Hoc Networks", In Proceedings of MOBICOM 2002, Sep. 23, 2002, pp. 36-47.
Mazzanti, et al., "Analysis and Design of Injection-Locked LC Dividers for Quadrature Generation", IEEE Journal of Solid-State Circuits, vol. 39, No. 9, Sep. 2004, pp. 1425-1433.
Mujtaba, "TGn Sync Proposal Technical Specification", IEEE 802.11-04/0889r6, This document presents the technical specification for the MAC and the PHY layer of the TGn Sync proposal to IEEE 802.11 TGn,May 18, 2005, pp. 1-131.
Qiao, et al., "Interference Analysis and Transmit Power Control in IEEE 802.11a/h Wireless LANs", IEEE / ACM Transactions on Networking, IEEE / ACM, New York, NY, US, vol. 15. No. 5, Oct. 1, 2007, 14 Pages.
Tinnirello, et al., "Revisit of RTS / CTS Exchange in High-Speed IEEE 802.11 Networks", World of Wireless Mobile and Multimedia Networks. 2005. Wowmom 2005. Sixth IEEE International Symposium on a Taormina-Giardini Naxos, Italy Jun. 13-16, 2005 Piscataway, NJ, USA,IEEE, Los Alamitos, CA, USA, Jun. 13, 2005, 10 Pages.
"Corrected Notice of Allowance", U.S. Appl. No. 13/735,458, Apr. 20, 2015, 2 pages.
"Final Office Action", U.S. Appl. No. 14/466,687, Apr. 30, 2015, 13 pages.
"Non-Final Office Action", U.S. Appl. No. 12/646,802, Apr. 8, 2015, 19 pages.
"Notice of Allowance", U.S. Appl. No. 13/622,916, Mar. 30, 2015, 4 pages.
"Supplemental Notice of Allowance", U.S. Appl. No. 13/429,090, Mar. 30, 2015, 2 pages.
"Supplemental Notice of Allowance", U.S. Appl. No. 13/622,916, May 7, 2015, 2 pages.
"Supplemental Notice of Allowance", U.S. Appl. No. 14/275,615, Jun. 5, 2015, 4 pages.
"Non-Final Office Action", U.S. Appl. No. 14/466,687, Aug. 27, 2015, 15 pages.
"Supplemental Notice of Allowance", U.S. Appl. No. 13/622,916, Jul. 10, 2015, 2 pages.
Ekici, et al., "IEEE 802.11a Throughput Performance with Hidden Nodes", IEEE Communication Letters, vol. 12, No. 6, Jun. 2008, 3 pages.
"Notice of Allowance", U.S. Appl. No. 12/646,802, Oct. 28, 2015, 6 pages.
"Notice of Allowance", U.S. Appl. No. 14/466,687, Dec. 18, 2015, 9 pages.
Roth, "ESS and BSS Service Sets", Windows IT Pro; retrieved from http://windowsitpro.com/networking/ess-and-bss-service-sets, Sep. 2002, 1 page.
"SSID (Service Set Identifier)", Toshiba, Service Set Identifier and How it Enables Wireless Access; Version 1.0, Aug. 14, 2003, 3 pages.

\* cited by examiner

WAKEUP BEACONS FOR MESH NETWORKS

RELATED APPLICATION

This application is a continuation of and claims priority to U.S. Utility patent application Ser. No. 13/099,169 filed May 2, 2011, which claims priority to U.S. Provisional Patent Application Ser. No. 61/333,546 filed May 11, 2010, the disclosures of which are incorporated by reference herein in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A mesh network can be implemented as a wired or wireless communication network of various fixed and/or mobile devices that are commonly referred to as "nodes" of the mesh network. Each of the node devices can communicate data throughout the mesh network, such as throughout a college campus, metropolitan area, or community network. A node device can also function to route data from one node to another within the mesh network.

A wireless mesh network can include various wireless clients and devices implemented for wireless communication utilizing a data packet routing protocol. For example, the Institute of Electrical and Electronics Engineers (IEEE) Standard 802.11s describes mesh networking for wireless communications over a wireless local-area-network (WLAN). A wireless mesh network can also be implemented for data communication with other networks that are communicatively linked to the mesh network, such as with another wireless network, wired network, wide-area-network (WAN), and the like.

In a wireless mesh network, communication links are formed between the various wireless clients and devices that are the nodes of the network. The data packets for wireless communications in the network can be forwarded or routed from a source node (e.g., transmitting device) to a destination node (e.g., receiving device) via intermediate node(s).

In wireless and wired mesh networks, however, node devices often have power constraints, such as those caused by the node operating on battery power (either commonly or in emergency situations) or those imposed by costs or environmental constraints. To save power, conventional node devices may enter a power-save mode. As part of conventional power-save modes, node devices temporarily reduce power and cease communications but periodically power back up to send and receive management beacons. Thus, a node wakes up at a particular time, receives management beacons from neighbor nodes, and transmits its own management beacon to these neighbors. These conventional techniques, however, often fail to save a node device much, if any, power. This is due in part to the size of the management beacons and the speed of reception and transmission of those beacons. This is exacerbated by the structure of many mesh networks, in which a node attempting to save power may have many neighbor nodes. For each neighbor node, the node attempting to save power stays awake to receive a management beacon from each neighbor node.

SUMMARY

This Summary is provided to introduce a selection of concepts in a simplified form that are further described below in the Detailed Description.

A method embodiment is described, which includes determining a wakeup beacon schedule for a node of a mesh network, having the node enter a power-saving state, wherein during the power-saving state, the node has insufficient power to permit communications with one or more peer nodes of the mesh network, exiting, in accordance with the wakeup beacon schedule, the power-saving state and entering a communication state, wherein during the communication state, the node is permitted to communicate with the one or more peer nodes of the mesh network, receiving one or more wakeup beacons from the one or more peer nodes of the mesh network, each of the one or more wakeup beacons indicating whether or not data is waiting to be received by the node, remaining in the communication state if at least one of the one or more wakeup beacons indicates data is waiting to be received by the node, and re-entering the power save mode if not at least one of the one or more wakeup beacons indicates data is waiting to be received by the node.

Another method embodiment is described, which includes receiving, from a transmitting node of a mesh network, data intended for a receiving node currently in a power-save mode, transmitting, in accordance with a previously determined wakeup beacon schedule and by an intermediate node between the transmitting node and the receiving node, a wakeup beacon to the receiving node, the wakeup beacon indicating that the data is available but not including the data within the wakeup beacon, receiving, at the intermediate node and from the receiving node, an indication that the receiving node is able to receive the data or has exited the power-save mode, and responsive to the indication from the receiving node, transmitting the data to the receiving node.

A System-on-Chip embodiment is described that is configured to determine a wakeup beacon schedule for a node of a mesh network, have the node enter a power-saving state, wherein during the power-saving state the node has insufficient power to permit communications with one or more peer nodes of the mesh network, having the node exit the power saving state and enter a communication state in accordance with the wakeup beacon schedule, wherein during the communication state, the node is permitted to communicate with the one or more peer nodes of the mesh network, receive one or more wakeup beacons from the one or more peer nodes of the mesh network, each of the one or more wakeup beacons indicating whether or not data is waiting to be received by the node, maintain the node in the communication state to permit the node to receive the data indicated by the one or more wakeup beacons if at least one of the one or more wakeup beacons indicates data is waiting to be received by the node, and having the node re-enter the power-saving state if not at least one of the one or more wakeup beacons indicates data is waiting to be received by the node.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for saving power at nodes of a mesh network often fail to save significant amounts of power. This disclosure describes techniques and apparatuses for enabling wakeup beacons for mesh networks, which often permits nodes of a mesh network to save additional power. These wakeup beacons can be sent at higher transmission rates and/or can be much smaller than current beacons conventionally sent and received, such as management beacons, thereby reducing the time the node must be awake to transmit and receive communications.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
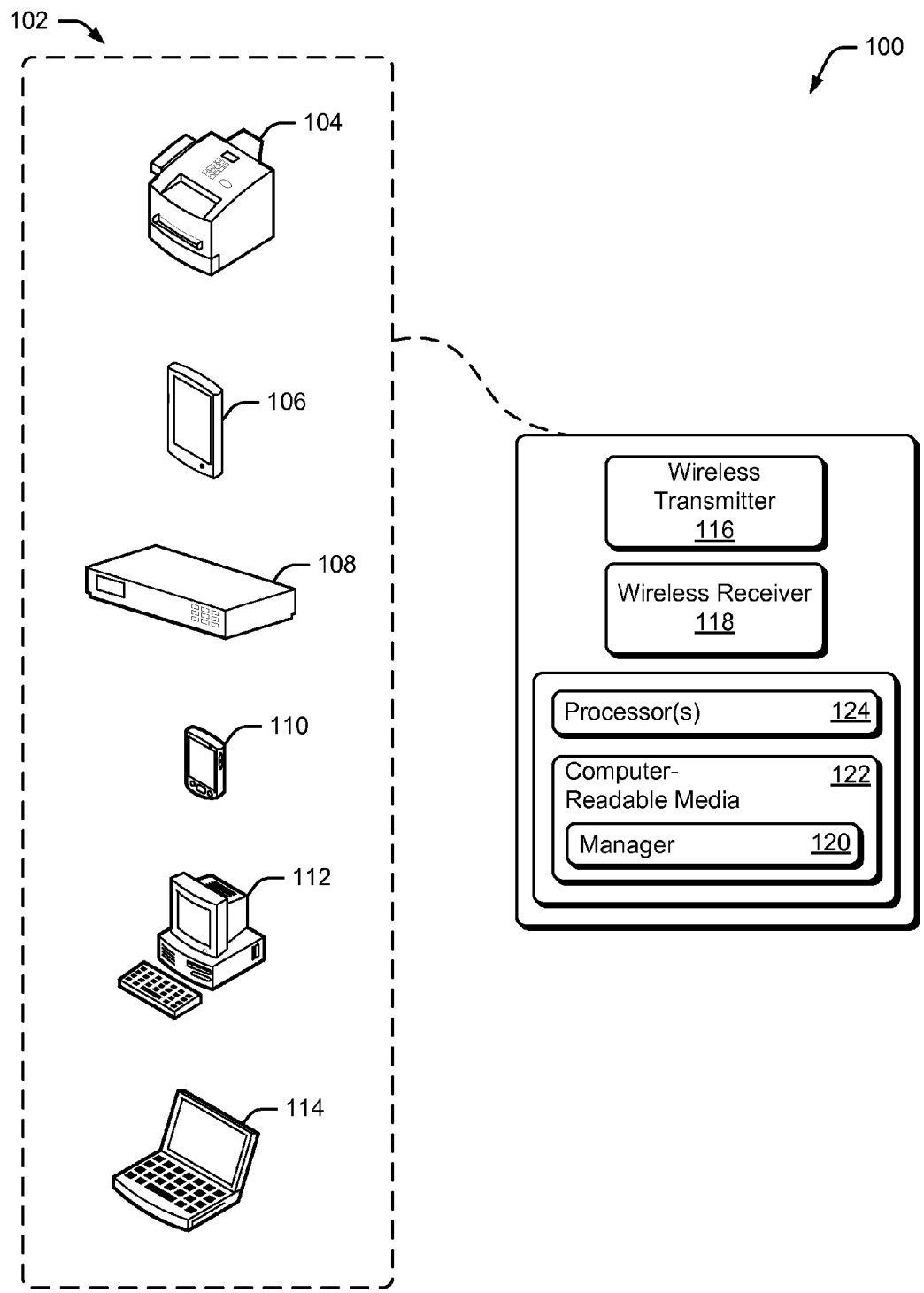
FIG. 1 illustrates an operating environment having wireless-communication-capable devices in accordance with one or more embodiments.

FIG. 1 illustrates an operating environment 100 having wireless-communication-capable devices 102 (herein "nodes 102"), which are capable of transmitting and receiving wireless communications, such as those of a wireless mesh network. Nodes 102 include a printing device 104, a tablet computing device 106, a set-top box 108, a cellular phone 110, a desktop computing device 112, and a laptop computing device 114, though other devices also or instead may be used.

Each of nodes 102 includes a wireless transmitter 116, a wireless receiver 118, and a manager 120 for managing wakeup beacons. Manager 120 may also handle wireless communications generally, such as those conforming to various communication protocols, e.g., those of the IEEE 802.11 family of protocols. Transmitter 116 and receiver 118 may be separate (shown) or combined (often called a transceiver, not shown) and may be hardware combined with or separate from software or firmware.

Manager 120 may include a set of computer-executable instructions stored on computer-readable storage media 122. When executed by one or more processors 124, node 102 acts according to those instructions. Manager 120 may act independently or in conjunction with various other entities, such as transmitter 116 and receiver 118. Manager 120 may be separate from or integral with other entities of node 102 as well, such as by being firmware integrated into a System-on-Chip (SoC) having or communicating with transmitter 116 and receiver 118.

Figure 2:
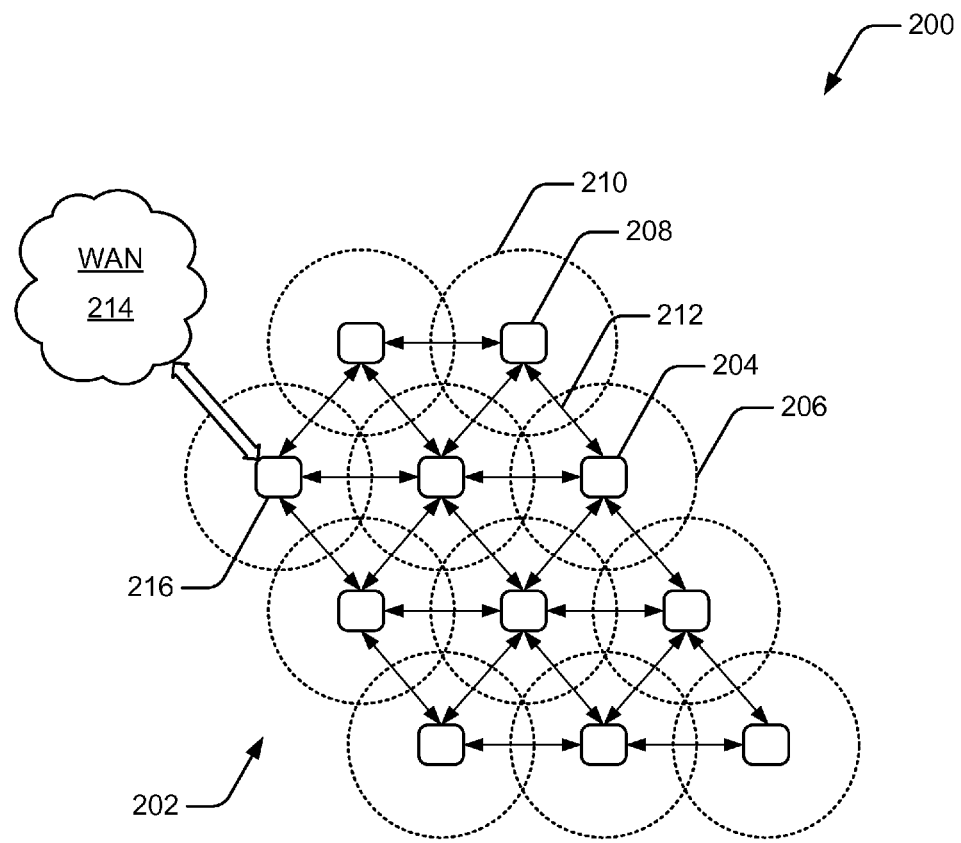
FIG. 2 illustrates an example mesh network, which can be implemented as a wired or wireless communication network in which various node devices can implement wakeup beacons for mesh networks.

FIG. 2 illustrates an example environment 200 that includes a mesh network 202, which can be implemented as a wired or wireless communication network in which various node devices can implement wakeup beacons for mesh networks. A mesh node 204 is illustrative of the various nodes that are communicatively linked to form the mesh network 202 with wired and/or wireless communication links. For example, mesh node 204 can be implemented as a wireless communication device having a data communication range depicted at 206. A neighboring mesh node 208 also has a data communication range depicted at 210 that overlaps the communication range of mesh node 204 such that the two nodes are communicatively linked for wireless data communication. Alternatively or in addition, the two neighboring mesh nodes can be communicatively linked via a wired connection.

The various node devices can receive and communicate data throughout the mesh network 202, and any of the node devices can also function as a router or relay to forward data from one node to another within the mesh network. The arrowed communication links, such as communication link 212 that links mesh node 204 with mesh node 208, are merely exemplary to depict the wired and/or wireless communication links and/or routes between the various node devices that are communicatively linked to form the mesh network 202. In general, one or more of the arrowed communication links facilitate two-way data communication, such as from mesh node 204 to mesh node 208 and vice-versa.

The mesh network 202 can also be implemented for data communication with other networks that are communicatively linked to the mesh network, such as with another wireless network, wired network, wide-area-network (WAN) 214, and the like. The mesh network 202 also includes a mesh node 216 that is a root node (also commonly referred to as a "portal") of the mesh network 202 that connects the network to an external device or other network, such as the WAN 214 (e.g., the Internet or a Public Switched Telephone Network (PSTN)).

In one or more embodiments, mesh network 202 is an example of a mesh network implemented with node devices (e.g., node 102) that wirelessly receive and communicate data utilizing a wireless networking standard. For example, mesh network 202 can be implemented in a wireless LAN (WLAN) communication system in which data packets of the communication data are communicated compliant with the Institute of Electrical and Electronics Engineers (IEEE) Standard 802.11s.

Example Techniques Using Wakeup Beacons for Mesh Networks

The following discussion describes techniques using wakeup beacons for mesh networks. These techniques can be implemented utilizing the previously described environments of FIGS. 1 and/or 2. These techniques include methods illustrated in FIGS. 3 and 6, each of which is shown as a set of operations performed by one or more entities. These methods are not necessarily limited to the orders shown for performing the operations.

Figure 3:
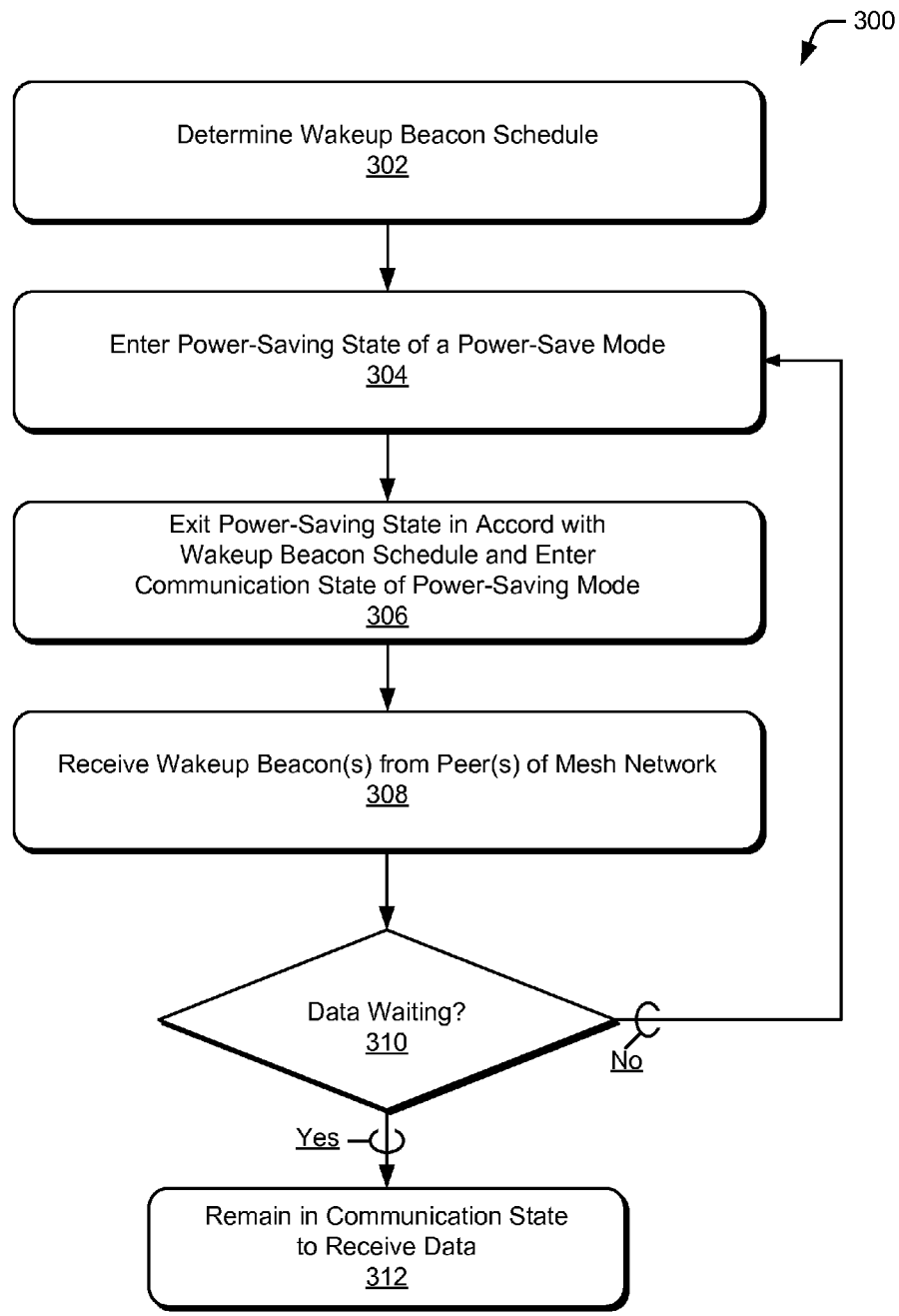
FIG. 3 illustrates an example method for using wakeup beacons for mesh networks to save power at nodes operating in a power-save mode from the perspective of the node operating in the power-save mode.

FIG. 3 depicts a method 300 for using wakeup beacons for mesh networks to save power at nodes operating in a power-save mode from the perspective of the node operating in the power-save mode. At 302, a wakeup beacon schedule is determined for a node of a mesh network. The wakeup beacon schedule can be determined in various manners, including by manager 120 of FIG. 1 acting on node 102 or node 204, which can negotiate a wakeup beacon schedule with one or more peer nodes of the mesh network (e.g., four peer nodes shown in FIG. 2 for node 204). Manager 120 may provide a wakeup beacon schedule to one or more peer nodes of the mesh network that those nodes accept, or manager 120 may receive and accept the wakeup beacon schedule from peers of the mesh network.

More specifically, manager 120 may transmit a request to peer nodes of the mesh network to establish wakeup beacon broadcasts having the wakeup beacon schedule. Manager 120 then receives, from the peer nodes, responses accepting the request and the wakeup beacon schedule or accepting the request and overriding the requested wakeup beacon schedule with a different wakeup beacon schedule. While not shown in method 300, determining a wakeup beacon schedule may be performed after or commensurate with a node determining that the node and peer nodes are capable of broadcasting and using wakeup beacons. Determining this capability can be performed through sending and receiving, within an extended capability element of a non-wakeup beacon (e.g., a management beacon), an indication of this capability.

Figure 4:
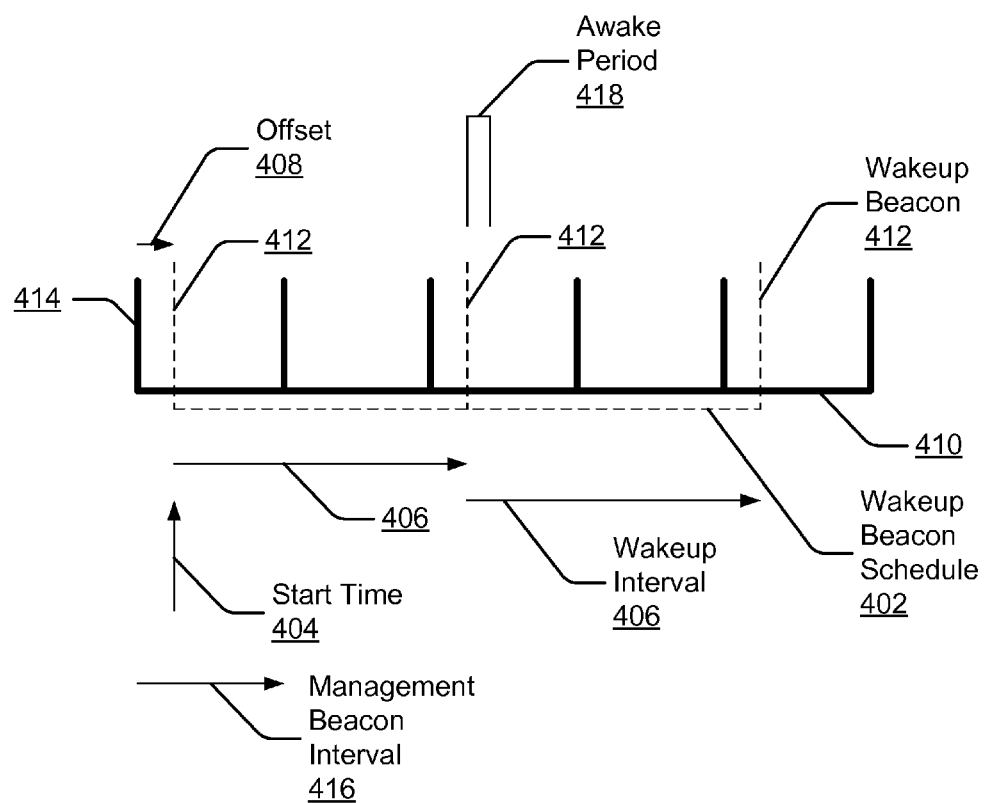
FIG. 4 illustrates an example wakeup beacon schedule having a start time, a wakeup beacon interval, and an offset relative to a management beacon schedule.

This wakeup beacon schedule may include a start time and a wakeup interval, as well as an offset against other scheduled broadcasts, such as non-wakeup beacon broadcasts. FIG. 4 illustrates an example wakeup beacon schedule 402 having a start time 404, a wakeup beacon broadcast interval (wakeup interval) 406, and an offset 408 relative to a management beacon schedule 410. Wakeup beacons 412 are first transmitted and received at start time 404 and then every wakeup interval 406. Management beacons 414 are broadcast (or may be broadcast) every management beacon interval 416 (only the first of each marked for visual brevity). Note that wakeup interval 406 is equal to about two times the management beacon interval 416.

While example wakeup beacon schedule 402 includes wakeup beacons 412 at each of wakeup intervals 406, a node in a power-saving state will not necessarily wake up for every beacon. When a node wakes up at every beacon interval and that interval is short, the node's power-save mode is called a light-sleep mode. In a deep-sleep mode, the node wakes at longer intervals. Some nodes may operate in a light-sleep mode and some in a deep-sleep mode if the mesh network's routing and structure permit this (e.g., a deep-sleep mode for a node at an end of a route), though in some cases all nodes of the mesh network transmit and receive wakeup beacons at a same beacon interval. In some other cases, a wakeup beacon is sent infrequently, and thus transmitting and receiving a wakeup beacon even at every beacon interval is still a deep-sleep mode in that few wakeups are performed.

Continuing with method 300, at 304, a power-saving state of a power-save mode is entered by the node of the mesh network. The power-save mode includes two basic states, the power-saving state and a communication state. The power-saving state is generally a non-communication state, sometimes considered a "sleep" state, which is one in which the device saves power by not communicating with one or more nodes within the mesh network. This power-saving state may involve turning off power to some parts of the node, though this is not necessarily required. The sleep state may also involve a near-complete shutdown of the node device 102, though again this is not required. At the least, however, this power-saving state is one in which node 102 does not communicate with at least one peer node of the mesh network.

Returning to the example wakeup beacon schedule 402 of FIG. 4, manager 120 of node 102 or 204 shuts down power to wireless transmitter 116 and wireless receive 118 at start time 404 and remains in this state for about one or some multiple of wakeup interval 406.

At 306, the power-saving state of the power-save mode is exited by the node of the mesh network in accordance with the wakeup beacon schedule determined at block 302. Thus, at 306, manager 120 has node 102 or 204 exit the power-saving state and enter the communication state. The length of time that node 102 or 204 may remain in the communication state depends on the wakeup beacon schedule, which in turns depends on a transmission rate of the wakeup beacons, a processing time at the node to process the received wakeup beacons, the number of wakeup beacons to be received, and, if the node is transmitting a wakeup beacon, the time associated with the transmission and processing of that transmitted wakeup beacon. In the ongoing example, the time at which the node is out of the power-saving state, and thus in the communication state and permitted to communicate, is shown at awake period 418 of FIG. 4.

Figure 5:
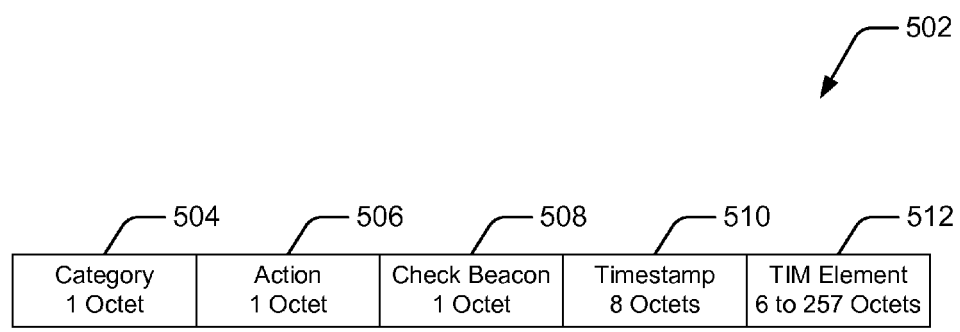
FIG. 5 illustrates an example wakeup beacon having fields for category, action, check beacon, timestamp, and traffic information.

By way of example, consider first a size and contents of wakeup beacon 502 shown in FIG. 5. Here wakeup beacon 502 includes five fields, a category field 504, an action field 506, a check beacon field 508, a timestamp 510, and a traffic information map (TIM) element 512. These fields of wakeup beacon 502 can have sizes of 1, 1, 1, 8, and 6-257 octets, respectively, for a total size as little as 35 bytes. In this particular example no offset is included—the offset is instead negotiated previously and is set from a management beacon interval, sometimes referred to as a target beacon transmission time (TBTT).

Timestamp 510 can be used to establish a synchronization between the nodes of the mesh network, such as by all of the nodes sending out their own timestamp and the nodes taking the last-in-time timestamp of those transmitted.

Either or both of check beacon field 508 or TIM element 512 can indicate that information is waiting for the node that is sleeping. In the case of the check beacon field 508, it indicates that a non-wakeup beacon, such as a management frame, has information for the sleeping node. TIM element 512 may include the information itself or indicate, in many cases, that a peer node has information waiting for the node, such as buffered packets of data waiting to be transmitted to the node. Note that this transmission to the node is not necessarily indicative that the node itself is the final destination, as instead it may have data waiting to be received and retransmitted as part of a routing protocol of the mesh network.

Transmission and reception speeds can be at 1 Mbps or higher, such as 6 Mbps or 24 Mbps, to name just a few. At 24 Mbps and 35 bytes in length, each wakeup beacon can take as little as 0.011 microseconds to communicate. Compare this, for example, to current management beacons sent at 1 Mbps and 256 bytes, which take about two milliseconds.

Consider this in the context of mesh network 202 of FIG. 2. Here node 204 has four neighboring peer nodes, node 208 and three others. Thus, four wakeup beacons are received during awake period 418. Here also node 204 transmits one wakeup beacon to these four peer nodes, thus, five wakeup beacons total are communicated. Each of the wakeup beacons takes 0.011 μs to communicate. Each of the received wakeup beacons takes time to process, here assumed to be 0.001 μs. The transmitted wakeup beacon is assumed to take 0.002 μs to process. Thus, the total awake period 418 for this example would be 5×0.011+4×0.001+1×0.002=0.061 μs. Compare this to current management beacons used in some conventional power-save modes, which result in this same 5-node scenario as at least 5×2.0=10.0 ms (excluding processing).

Returning to method 300, at 308 one or more wakeup beacons from one or more peer nodes of the mesh network are received. As noted above, each wakeup beacon, such as wakeup beacon 502, indicates that data is or is not waiting to be received by the node. At 310, whether or not data is waiting for the node is determined. Thus, manager 120 of node 204, for example, may determine, based on reading information in the received wakeup beacons, whether or not data is waiting for node 204, and thus whether or not node 204 should remain awake to receive that data. If data is determined to be waiting, method 300 continues along the "Yes" path to block 312. At block 312, the node maintains the communication state to permit the node to receive data indicated by the one or more wakeup beacons. If data is determined not to be waiting, method 300 continues along the "No" path to block 304 to re-enter the power-saving state of the power-save mode.

Concluding the ongoing example, if manager 120 of node 204 determines, from reading check beacon field 508 and TIM element 512 of wakeup beacon 502, that no data is available, node 204 re-enters the power-saving state. If, on the other hand, manager 120 of node 204 reads check beacon field 508 and TIM element 512 of wakeup beacon 502 and determines that data is waiting for node 204, manager 120 may cause node 204 to stay awake to receive the data. Note that how node 204 acts depends on whether data is in a management or other type of beacon, or is being buffered in a peer node. Node 204 may return to a power-saving state at block 304 at some later time, though this is not required.

Figure 6:
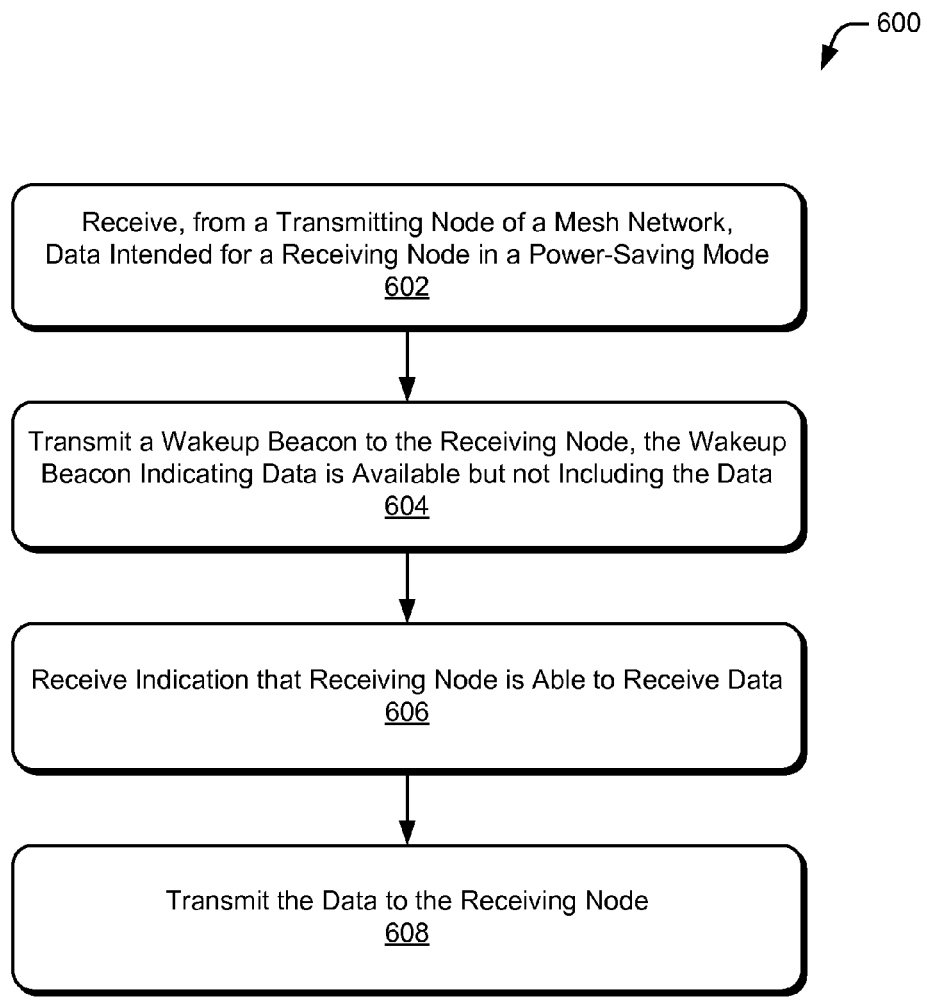
FIG. 6 illustrates an example method for using wakeup beacons for mesh networks to save power at nodes operating in a power-save mode, here from the perspective of a node that is transmitting wakeup beacons.

FIG. 6 depicts a method 600 for using wakeup beacons for mesh networks to save power at nodes operating in a power-save mode. Method 600 is described from the perspective of a node that is transmitting wakeup beacons, which may or may not also be operating in a power-save mode.

At 602, data intended for a receiving node currently in a power-save mode is received from a transmitting node of a mesh network and by an intermediate node. The intermediate node may be operating normally or, as noted in greater detail above, the intermediate node may be operating in a power-save mode. If operating in a power-save mode, the intermediate node receives an indication that this data is waiting from a transmitting node during a wake period (e.g., during a communication state of the intermediate node's own power-save mode), and then wakes up and receives this data. Note that in such a case the intermediate node may indicate, to the receiving node, that data is waiting prior to receiving the data, so long as the indication received indicates to which downstream node the data is intended.

Figure 7:
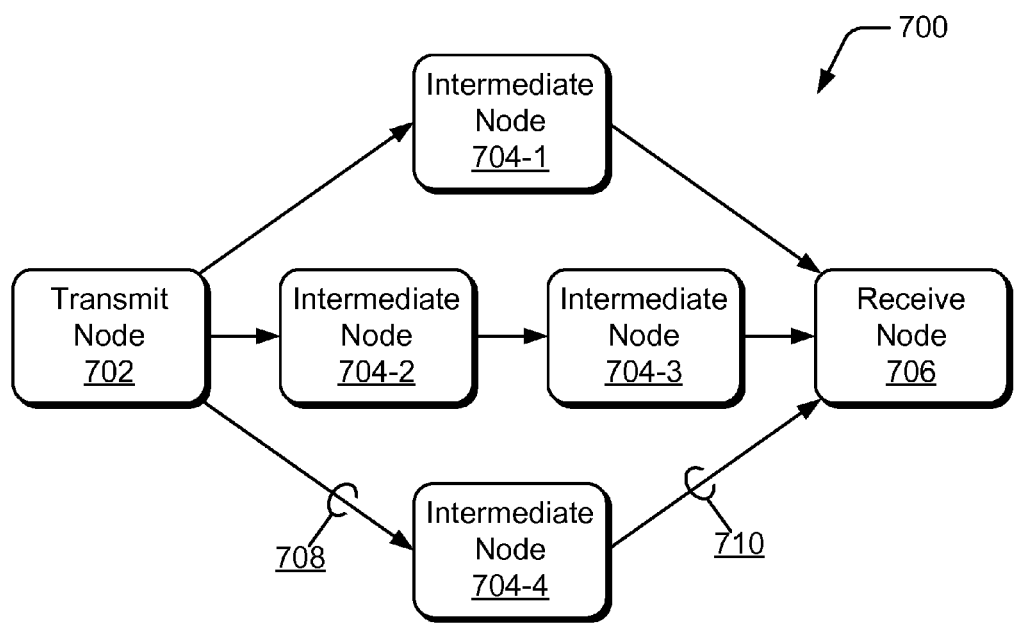
FIG. 7 illustrates part of an example mesh network including a transmit node, intermediate nodes, and a receive node.

By way of example, consider FIG. 7, which illustrates part of a mesh network 700 having a transmit node 702, intermediate nodes 704-1, 704-2, 704-3, and 704-4, and receive node 706. Each of these nodes may be examples of node device 102 of FIG. 1 and include manager 120. Here intermediate node 704-4 receives, through wireless communication 708, data from transmit node 702 and intended for receive node 706. Note that the receiving node of method 600 does not have to be the final destination, thus, method 600 may operate with intermediate node 704-2, where the receiving node is then intermediate node 704-3, which then operates to send data on to receive node 706. Likewise, the transmitting node need not be a first source of the data but instead an intermediate from some other node.

At 604, a wakeup beacon is transmitted to the receiving node, the wakeup beacon transmitted according to a previously determined wakeup beacon schedule, by the intermediate node, and indicating whether data is or is not available. This wakeup beacon can indicate that the data is available but does not necessarily include that data. Note that the wakeup beacon schedule is previously determined in one or more manners set forth above. The wakeup beacon can be any one of the wakeup beacons contemplated herein, such as wakeup beacon 502 of FIG. 5.

The data intended for the receiving node can be buffered by manager 120 at intermediate node 704-4, for example, and then this data indicated in the wakeup beacon 502 as part of TIM element 512. The data may instead be included in a management beacon received by intermediate node 704-4. In such a case, intermediate node 704-4 may include a check beacon indicator in check beacon field 508 of the wakeup beacon 502. Intermediate node 704-4 may then transmit this management beacon or, if another node is transmitting the management beacon and receive node 706 is known to be able to receive that management beacon, intermediate node 704-4 may forgo sending the management beacon having the data indicated. Thus, in some cases method 600 is performed by an intermediate node without having to buffer the data intended for the receiving node. Note also that intermediate node 704-4 may forgo transmitting management beacons if its peer neighbors are able to use wakeup beacons. In some cases a node of a mesh network, however, such as 200 or 700, may not be able to send and receive wakeup beacons. In such a case some of the nodes of those mesh networks will then transmit management beacons instead or in additional to wakeup beacons.

At 606, an indication is received, at the intermediate node and from the receiving node, indicating that the receiving node is able to receive the data or has exited the power-save state or mode. Continuing the example, receive node 706 receives the wakeup beacon from intermediate node 704-4 and responds through wireless communication 710 to indicate that receive node 706 is awake and ready to receive data. In some cases, however, 606 is not needed. For data included within a management beacon, for example, manager 120 at intermediate node 704-4 may assume that receive node 706 is awake or will be awake in sufficient time to receive one of multiple management beacons having the data, such as multiple management beacons 414 sent according to management beacon schedule 410, both of FIG. 4.

At 608, the data is transmitted by the intermediate node to the receiving node. As noted, this can be through wireless communication 710, and may be through a management beacon or in other manners, such as those following the 802.11 family of protocols. Concluding the present example, intermediate node 704-4 transmits data to receive node 706.

System-on-Chip

Figure 8:
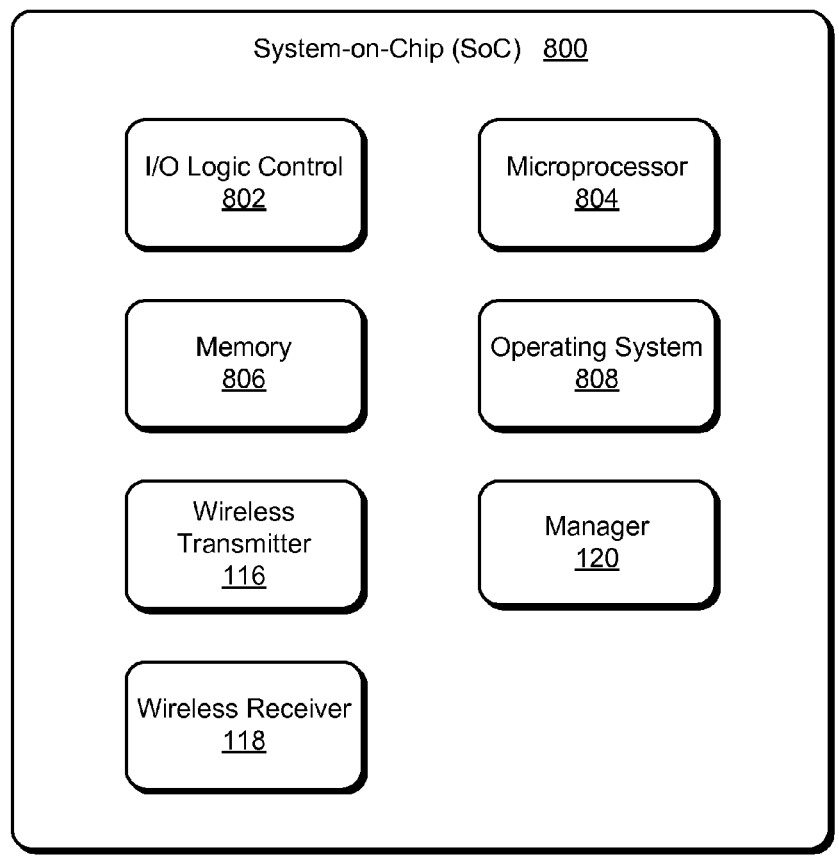
FIG. 8 illustrates a System-on-Chip (SoC) environment for implementing embodiments of the techniques described herein.

FIG. 8 illustrates a System-on-Chip (SoC) 800, which can implement various embodiments described above. An SoC can be implemented in a fixed or mobile device, such as one or a combination of a media device, computer device, television set-top box, video processing and/or rendering device, appliance device, gaming device, electronic device, vehicle, workstation, WLAN access point or client station, and/or in any other type of device that may communicate wirelessly in a local or personal area network. Examples of some of these are shown in FIG. 1.

SoC 800 can be integrated with electronic circuitry, a microprocessor, memory, input-output (I/O) logic control, communication interfaces and components, other hardware, firmware, and/or software needed to run an entire device. SoC 800 can also include an integrated data bus (not shown) that couples the various components of the SoC for data communication between the components. A device that includes SoC 800 can also be implemented with many combinations of differing components.

In this example, SoC 800 includes various components such as an input-output (I/O) logic control 802 (e.g., to include electronic circuitry) and a microprocessor 804 (e.g., any of a microcontroller or digital signal processor). SoC 800 also includes a memory 806, which can be any type of random access memory (RAM), a low-latency nonvolatile memory (e.g., flash memory), read only memory (ROM), and/or other suitable electronic data storage. SoC 800 can also include various firmware and/or software, such as an operating system 808, which can be computer-executable instructions maintained by memory 806 and executed by microprocessor 804. SoC 800 can also include other various communication interfaces and components, wireless LAN (WLAN) or PAN (WPAN) components, other hardware, firmware, and/or software.

SoC 800 includes wireless transmitter 116, wireless receiver 118, and manager 120. Examples of these various components and/or entities, and their corresponding functionality, are described with reference to the respective components of the environment 100 shown in FIG. 1. Manager 120 in SoC 800, either independently or in combination with other entities, can be implemented as computer-executable instructions maintained by memory 806 and executed by microprocessor 804 to implement various embodiments and/or features described herein, such as acting as transmitter and/or receiver of wakeup beacons, whether in a power-save mode or not. Manager 120 may also be provided integral with other entities of the SoC, such as integrated with one or both of wireless transmitter 116 and wireless receiver 118. Alternatively or additionally, manager 120 and the other components can be implemented as hardware, firmware, fixed logic circuitry, or any combination thereof that is implemented in connection with the I/O logic control 802 and/or other signal processing and control circuits of SoC 800.

Although the subject matter has been described in language specific to structural features and/or methodological operations, the subject matter defined in the appended claims is not necessarily limited to the specific features or operations described above, including orders in which the operations are performed.

What is claimed is:

1. A method comprising:
   receiving, from a transmitting node of a mesh network, data intended for a receiving node currently in a power-saving mode;
   transmitting, according to a previously determined wakeup beacon schedule and by an intermediate node between the transmitting node and the receiving node, a wakeup beacon to the receiving node, the wakeup beacon indicating that the data is available but not including the data within the wakeup beacon, the previously determined wakeup beacon schedule including a start time and a broadcast interval, the start time offset from non-wakeup beacon broadcasts and the broadcast interval about equal to or about a multiple of a non-wakeup beacon broadcast interval;
   receiving, at the intermediate node and from the receiving node, an indication that the receiving node is able to receive the data; and
   responsive to the indication from the receiving node, transmitting the data to the receiving node.

2. The method of claim 1, wherein receiving the data is performed by the intermediate node during an awake period following an exit from a power-save state and further comprising re-entering the power-save state after transmitting the data to the receiving node.

3. The method of claim 1, further comprising determining the previously determined wakeup beacon schedule prior to receiving the data.

4. The method of claim 1, wherein the wakeup beacon indicates that the data is waiting to be received by the receiving node, the indication in a check beacon section or traffic information map (TIM) element of the wakeup beacon.

5. The method of claim 1, wherein the wakeup beacon is transmitted at data rates greater than 1 Mbps and is 35 or fewer bytes in size.

6. The method of claim 1, wherein transmitting the wakeup beacon transmits the wakeup beacon at about 6 or 24 Mbps.

7. The method of claim 1, wherein transmitting the data to the receiving node transmits a management beacon.

8. A System-on-Chip (SoC) capable of operating within an intermediate node of a mesh network, the SoC having:
   a transceiver; and
   a manager, the manager configured to:
      receive, at the transceiver of the intermediate node and from a transmitting node of the mesh network, data intended for a receiving node currently in a power-save mode, the transceiver of the intermediate node receiving the data intended for the receiving node during an awake period of the intermediate node and following an exit from a power-saving state of the intermediate node;
      transmit, in accordance with a previously determined wakeup beacon schedule and by the intermediate node between the transmitting node and the receiving node, a wakeup beacon to the receiving node and through the transceiver, the wakeup beacon indicating that the data is available but not including the data within the wakeup beacon;
      receive, through the transceiver of the intermediate node and from the receiving node, an indication that the receiving node is able to receive the data or has exited the power-save mode; and
      transmit, in response to the indication from the receiving node and through the transceiver, the data to the receiving node through a management beacon.

9. The SoC of claim 8, wherein the previously determined wakeup beacon schedule includes a start time offset from non-wakeup beacon broadcasts.

10. The SoC of claim 8, wherein the manager is further configured to cause the intermediate node to re-enter the power-saving state after transmitting the data to the receiving node.

11. The SoC of claim 8, wherein the wakeup beacon further indicates that the data is waiting, the indication in a check beacon field or traffic information map (TIM) element of the wakeup beacon.

12. The SoC of claim 8, wherein the wakeup beacon is 35 or fewer bytes in size and the transceiver is configured to transmit the wakeup beacon at a data rate higher than 1 Mbps.

13. The SoC of claim 8, wherein the wakeup beacon schedule includes a start time and a wakeup beacon broadcast interval, the start time offset from non-wakeup beacon broadcasts and the wakeup beacon broadcast interval about equal to or about a multiple of a non-wakeup beacon broadcast interval.

14. A method comprising:
   determining a wakeup beacon schedule for a node of a mesh network, the wakeup beacon schedule including a start time and a wakeup beacon broadcast interval, the start time offset from non-wakeup beacon broadcasts and the wakeup beacon broadcast interval about equal to or about a multiple of a non-wakeup beacon broadcast interval;

having the node enter a power-saving state, the power-saving state in which the node has insufficient power to permit communications with one or more peer nodes of the mesh network;

in accordance with the wakeup beacon schedule, having the node exit the power-saving state and enter into a communication state, the communication state in which the node has sufficient power to communicate with the one or more peer nodes of the mesh network;

receiving, at the node, one or more wakeup beacons from the one or more peer nodes of the mesh network, each of the one or more wakeup beacons indicating whether or not data is waiting to be received by the node;

determining that at least one of the one or more wakeup beacons indicates data is waiting to be received by the node, and:

maintaining the node in the communication state responsive to determining that at least one of the one or more wakeup beacons indicates that data is waiting to be received by the node, the maintaining of the node to permit the node to receive the data indicated by the one or more wakeup beacons; or having the node re-enter the power-saving state responsive to determining that none of the one or more wakeup beacons indicates data is waiting to be received by the node.

15. The method of claim 14, further comprising transmitting an outgoing wakeup beacon in accordance with the wakeup beacon schedule and intended for the one or more peers nodes of the mesh network, the outgoing wakeup beacon transmitted at a data rate higher than 1 Mbps, being 35 bytes or less in size, and indicating whether or not data is waiting for at least one of the one or more peer nodes.

16. The method of claim 14, wherein the one or more wakeup beacons indicate whether or not data is waiting to be received by the intermediate node in a check beacon field or traffic information map (TIM) element of each of the one or more wakeup beacons.

17. The method of claim 14, wherein the mesh network is a wireless local area network in which communications are made compliant with IEEE standard 802.11s.

18. A method comprising:

receiving, from a transmitting node of a mesh network, data intended for a receiving node currently in a power-save mode;

transmitting, in accordance with a wakeup beacon schedule and by an intermediate node between the transmitting node and the receiving node, a wakeup beacon to the receiving node, the wakeup beacon indicating that the data is available but not including the data within the wakeup beacon, the wakeup beacon schedule including a start time and a wakeup beacon broadcast interval, the start time offset from non-wakeup beacon broadcasts and the wakeup beacon broadcast interval about equal to, or about a multiple of, a non-wakeup beacon broadcast interval;

receiving, at the intermediate node and from the receiving node, an indication that the receiving node is able to receive the data or has exited the power-save mode; and transmitting, in response to the indication from the receiving node, the data to the receiving node through a management beacon.

19. The method of claim 18, wherein receiving the data is performed by the intermediate node during an awake period following an exit from a power-saving state and further comprising re-entering, at the intermediate node, the power-saving state after transmitting the data to the receiving node.

20. The method of claim 18, wherein the wakeup beacon indicates that the data is waiting, the indication in a check beacon field or traffic information map (TIM) element of the wakeup beacon.

* * * * *